United States Patent
Li et al.

(10) Patent No.: US 11,841,857 B2
(45) Date of Patent: Dec. 12, 2023

(54) QUERY EFFICIENCY USING MERGED COLUMNS

(71) Applicant: International Business Machines Corporation, Armonk, NY (US)

(72) Inventors: Shuo Li, Beijing (CN); Xiaobo Wang, Beijing (CN); Leilei Li, San Jose, CA (US); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/676,965

(22) Filed: Feb. 22, 2022

(65) Prior Publication Data
US 2023/0267121 A1 Aug. 24, 2023

(51) Int. Cl.
G06F 16/2453 (2019.01)
G06F 16/22 (2019.01)
G06F 16/2455 (2019.01)
G06F 11/34 (2006.01)

(52) U.S. Cl.
CPC .... *G06F 16/24542* (2019.01); *G06F 11/3409* (2013.01); *G06F 16/221* (2019.01); *G06F 16/2455* (2019.01)

(58) Field of Classification Search
CPC ............. G06F 16/24542; G06F 16/221; G06F 16/2455
See application file for complete search history.

(56) References Cited

U.S. PATENT DOCUMENTS

| 8,954,418 B2 * | 2/2015 | Faerber ............. G06F 16/24547 707/718 |
| 11,113,269 B1 | 9/2021 | Andrade Garcia |
| 11,520,739 B1 * | 12/2022 | Higgins ............. G06F 16/2471 |

(Continued)

FOREIGN PATENT DOCUMENTS

| CN | 107436918 B | 8/2020 |
| CN | 111639091 A | 9/2020 |

OTHER PUBLICATIONS

"Use sparse columns", Microsoft Docs, SQL Docs, Jul. 14, 2021, 11 pages, <https://docs.microsoft.com/en-us/sql/relational-databases/tables/use-sparse-columns?view=sql-server-ver15>.

(Continued)

*Primary Examiner* — Dangelino N Gortayo
(74) *Attorney, Agent, or Firm* — Daniel M. Yeates (57) ABSTRACT

A computer-implemented method to transform and execute queries by merging sparsely populated columns. The method includes receiving, from a host, a first query configured to perform a command on one or more target columns in a database. The method further includes analyzing a set of statistics for the database. The method also includes determining, based on the analyzing, a first column of the one or more target columns is included in a set of sparse columns. The method includes generating a plurality of access plans for the first query, including a first access plan that merges the first column with a second column. The method further includes transforming, based on the first access plan, the first query to merge the first column with the second column. The method also includes executing, in response to the transforming of the first query, the first query.

20 Claims, 9 Drawing Sheets

(56) References Cited

U.S. PATENT DOCUMENTS

| | | | |
|---|---|---|---|
| 2015/0106382 A1* | 4/2015 | Liu | G06F 16/221 |
| | | | 707/769 |
| 2020/0226130 A1 | 7/2020 | Amzal | |
| 2021/0133193 A1* | 5/2021 | McConnell | G06F 16/24542 |
| 2022/0092069 A1* | 3/2022 | Hartsing | G06F 16/24544 |
| 2022/0318147 A1* | 10/2022 | Anand | G06F 16/21 |
| 2022/0391394 A1* | 12/2022 | Schreter | G06F 12/123 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

| Object | Statistics | | |
|---|---|---|---|
| Table | Cardinality | | |
| Single Column | Cardinality | | |
| | Low2Key | | |
| | High 2Key | | |
| | Frequency | | |
| | Histogram (quartiles) | Cardinality | |
| | | Low2Key | |
| | | High 2Key | |
| | | Frequency | |
| Multi-Column | Single Column Statistics | | |
| | Multi-Cardinality | | |
| | Multi-Column Frequency | | |
| Partition Table | Single Column Statistics | | |
| | Partition Key (Each Partition) | Cardinality | |
| | | Low2Key | |
| | | High 2Key | |
| | | Frequency | |

QUERY EFFICIENCY USING MERGED COLUMNS

BACKGROUND

The present disclosure relates to database performance, and, more specifically, merging sparse columns to improve performance.

Modern database systems can contain relatively large amounts of data, on the order of petabytes ($2^{50}$ bytes) and greater. Careful attention is given while generating the queries configured to retrieve, filter, sort, and/or perform other functions on the data. Minor variations in the queries can have a large effect on the efficiency of executing the query.

SUMMARY

Disclosed is a computer-implemented method to execute queries using a merged column. The method includes receiving, from a host, a first query configured to perform a command on one or more target columns in a database. The method further includes analyzing a set of statistics for the database. The method also includes determining, based on the analyzing, that a first column of the one or more target columns is included in a set of sparse columns. The method includes generating a plurality of access plans for the first query, including a first access plan that merges the first column with a second column. The method further includes transforming, based on the first access plan, the first query to merge the first column with the second column. The method also includes executing, in response to the transforming of the first query, the first query. Further aspects of the present disclosure are directed to computer program products containing functionality consistent with the method described above.

Further disclosed is a system to execute merged queries, the system comprising a process, a database, and a computer-readable storage medium communicatively coupled to the processor and storing program instructions which, when executed by the processor, are configured to cause the processor to analyze a set of database statistics to determine a hole rate and a data distribution for each column of a plurality of columns stored in the database. The program instruction further cause the processor to identify, from one or more target columns of a first query and based on the hole rate for each column, a set of sparse columns from the one or more target columns. The program instruction also cause the processor to estimate a computation cost for each access plan of a set of access plans, where a first access plan includes merging two or more columns into a merged column, wherein the merged column comprises a first sparse column and a second sparse column from the set of sparse columns. The program instruction further cause the processor to transform, based on the first access plan having a lowest estimated computation cost, the first query to execute using the merged column.

The present Summary is not intended to illustrate each aspect, every implementation, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The present disclosure relates to database performance, and, more specifically, merging sparse columns to improve performance. While the present disclosure is not necessarily limited to such applications, various aspects of the disclosure may be appreciated through a discussion of various examples using this context.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations).

It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
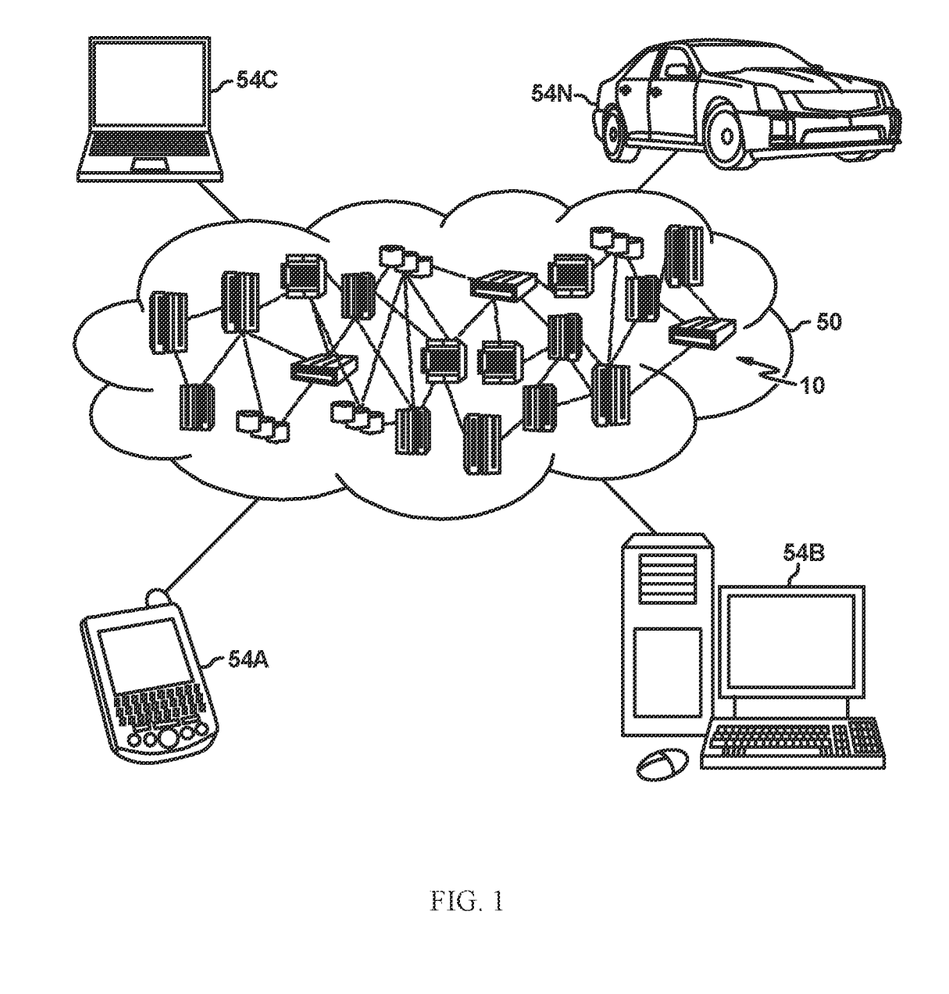
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
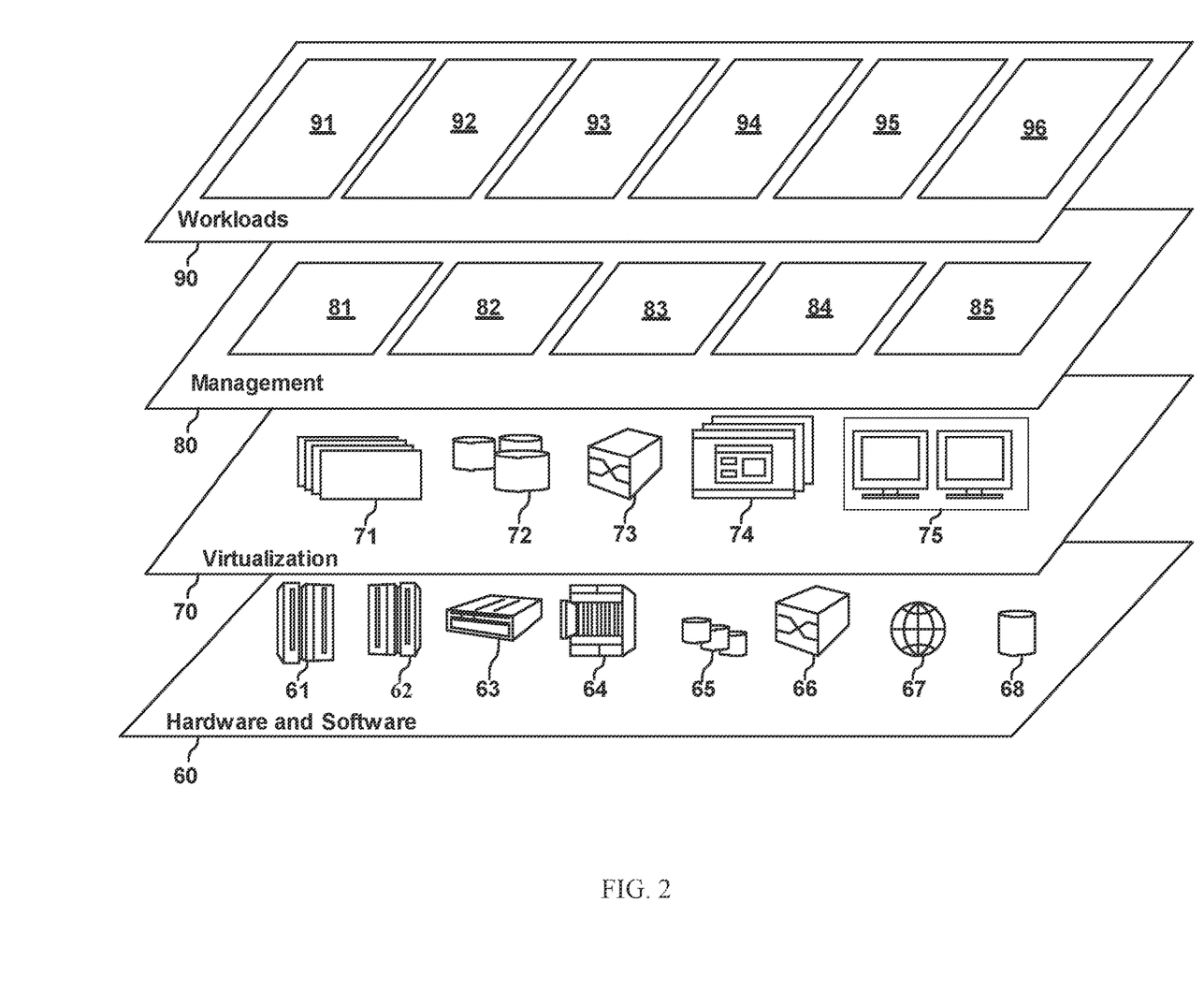
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query transformation 96.

Data Processing System in General

Figure 3:
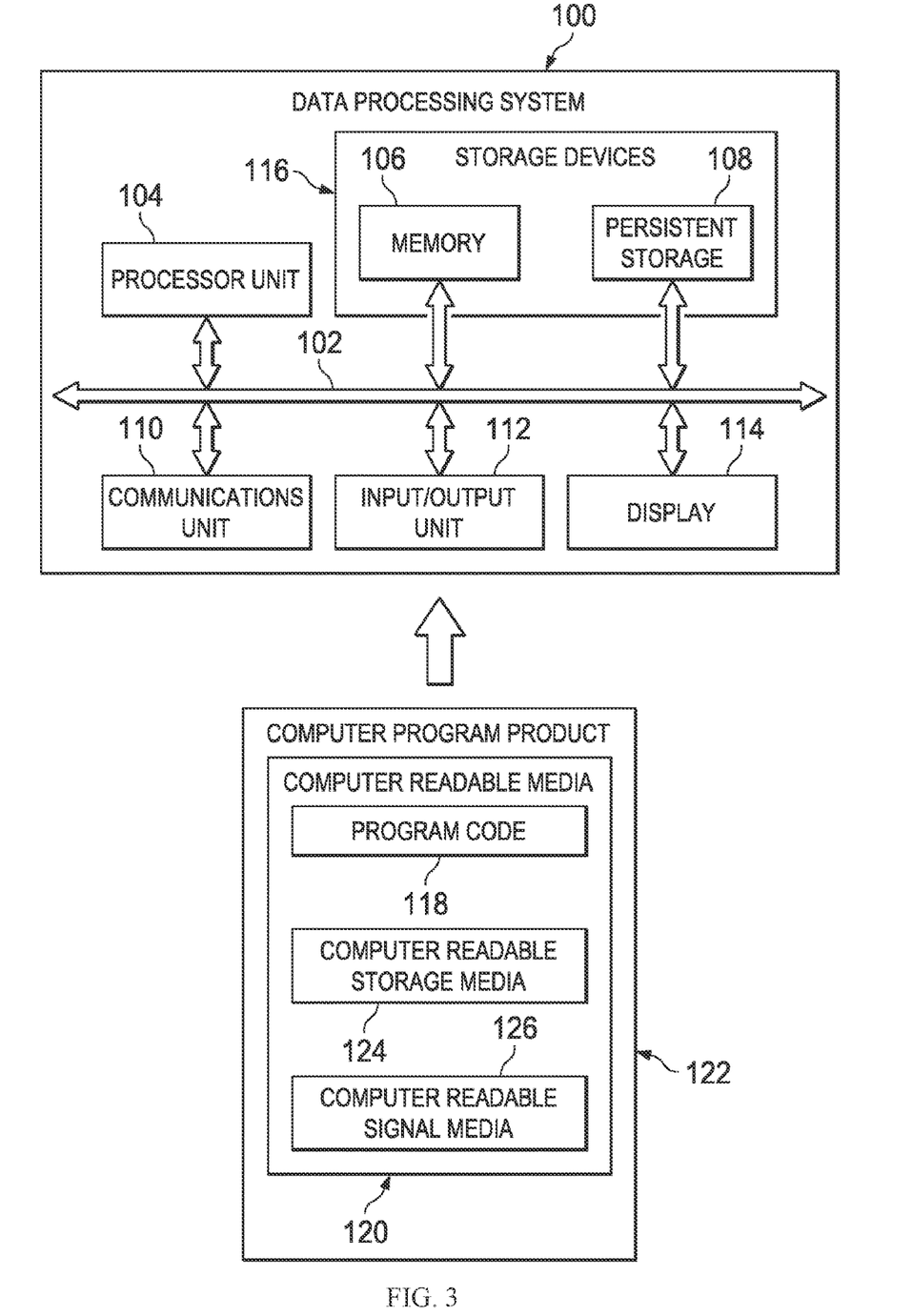
FIG. 3 is a block diagram of a Data Processing System (DPS) according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1.

Modern database systems can contain relatively large amounts of data, on the order of petabytes ($2^{50}$ bytes) and greater. Careful attention is given while generating the queries configured to retrieve, filter, sort, and/or perform other functions on the data. Minor variations in the queries can have a large effect on the efficiency of executing the query.

In relational databases, there are many situations where the data within a column change frequently and/or where the column has a large number of holes (Null values). When queries target these sparse columns, the execution can require all columns for the affected rows to be processed, even when there are a large number of holes. This can decrease the efficiency of the database system.

Embodiments of the present disclosure can reduce the computing cost of processing queries that target sparse columns. In some embodiments, a query manager can increase the efficiency of query processing by merging columns, where at least one of the columns is a sparse column. Additionally, the processing of a query with a merged column will occur when there is cost benefit to merging the columns and updating the query to use the merged column vice the original target column. The merging of columns can increase the number or rows captured per page by eliminating gathering several columns worth of null values and/or eliminates some or all of the null values processed with the query. Because there are many null values, the overall amount of data that is manipulated is essentially constant. It is simply compressed into a single column rather than spread through two or more sparse columns.

Embodiments of the present disclosure can include a query manager to process the queries. In some embodiments, the query manager can identify one or more sparse columns in one or more tables. A sparse column can be any column within a table that has one or more holes (e.g., null values). In some embodiments, the number holes or frequency of holes in a column determine whether a column can be considered a sparse. In some embodiments, a sparse column can be any column predetermined and/or marked as sparse column. The query manager can calculate a hole rate of columns, tables, and/or partitions based on database statistics. For purposes of this this application, a sparse column can include columns that have data that changes frequently, or said differently, each of the advantages gained from this disclosure can be applied to sparse columns and/or columns with data that changes frequently.

In some embodiments, the query manager can receive one of more queries to process. The queries can be configured to access data stored in a database. The access can include selecting, inserting, updating, deleting data, and/or any other database command. In some embodiments, the query is configured to perform an action on/access at least one of the sparse columns.

In some embodiments, the query manager can generate one or more access plans (or access paths) to execute the query. One or more of the access plans can include merging two or more columns. In some embodiments, at least one of the merging columns is a sparse column. In some embodiments, all of the merged columns are sparse columns. Each of the one or more access plans can combine a different combination of the targeted columns. In some embodiments, one or more of the access plans does not combine any of the columns. In some embodiments, generating the access plan includes predicting a computational cost (or cost) of executing the query.

In some embodiments, the query manager can select one of the one or access plans. In some embodiments, the selected query includes a merged column. In some embodiments, the query manager can execute the query according to the selected access plan. The execution can include updating/transforming the query. The transformation can include creating a combined column, merging two or more columns, and/or changing the target of the query to the combined column for the affected commands. The merged column can include multiple data types (e.g., var, varchar, etc.). In some embodiments, the transformation can alter/update a table definition.

Embodiments of the present disclosure can be implemented in existing database query systems. Various embodiments can provide an efficiency gain. Embodiments of the present disclosure can ensure the query manager only needs to access a single page(table). This can decrease the amount of time needed to complete the tasks as well as the amount of memory needed. Additionally, embodiments of the present disclosure can eliminate the need to perform an additional join (e.g., linking the sparse columns to a different document space rather than merging columns).

The aforementioned advantages are example advantages, and embodiments exist that can contain all, some, or none of the aforementioned advantages while remaining within the spirit and scope of the present disclosure.

Figure 4:
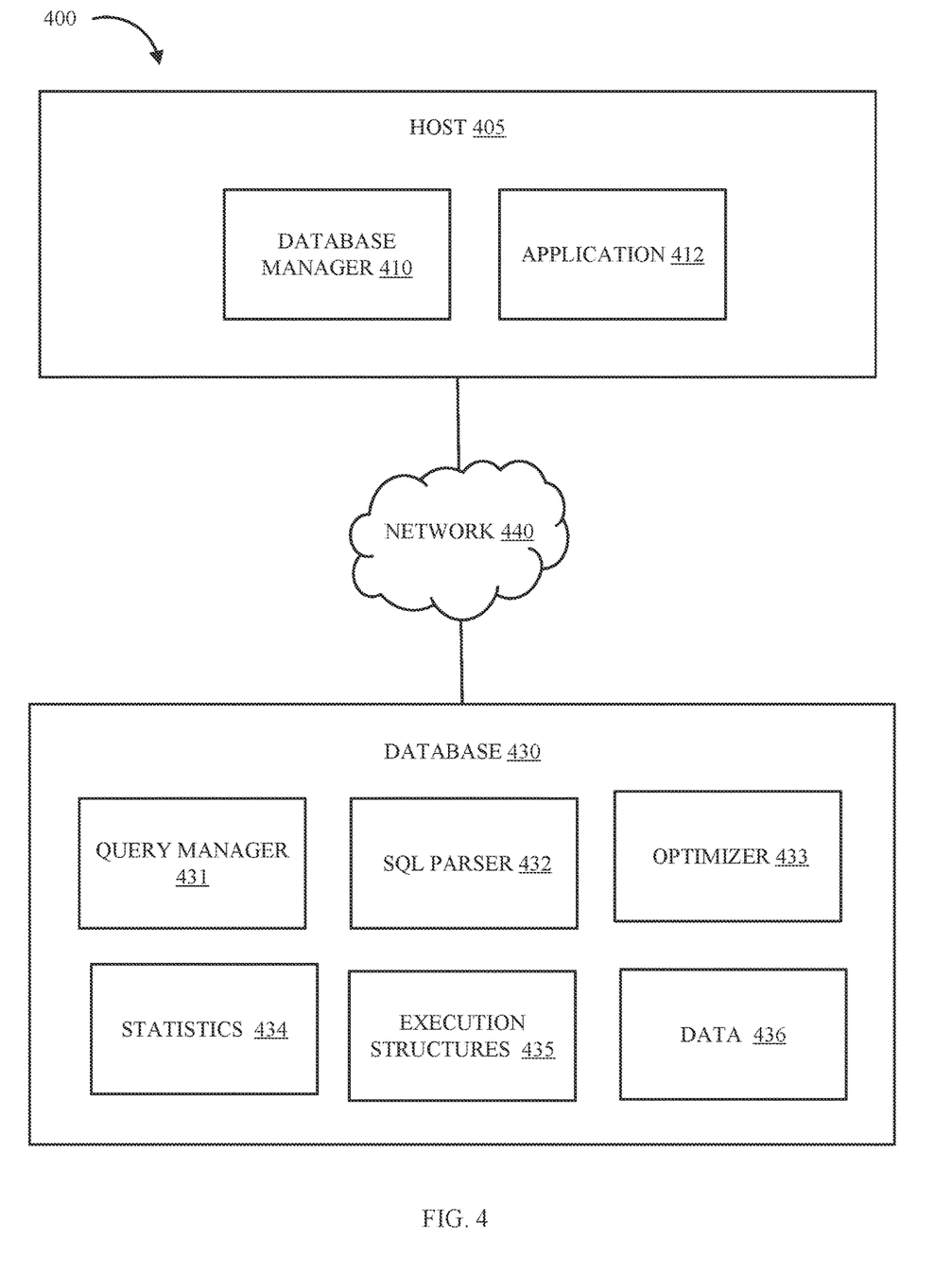
FIG. 4 illustrates a functional diagram of a computing environment suitable for operation of a query manager in accordance with some embodiments of the present disclosure.

Referring now to various embodiments of the disclosure in more detail, FIG. 4 is a representation of a computing environment 400 that is capable of running a query manager capable of transforming queries to use a merged column in accordance with one or more embodiments of the present disclosure. Many modifications to the depicted environment may be made by those skilled in the art without departing from the scope of the disclosure.

Computing environment 400 includes host 405, database 430, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between and among host 405, database 430, and other computing devices (not shown) within computing environment 400. In some embodiments, each of host 405 and database 430 may include a computer system, such as the data processing system 100 of FIG. 3.

Host 405 can be a standalone computing device, a management server, a web server, a mobile computing device, or any other electronic device or computing system capable of receiving, sending, and processing data. In other embodiments, host 405 can represent a server computing system utilizing multiple computers as a server system, such as in a cloud computing environment 50. In some embodiments, host 405 represents a computing system utilizing clustered computers and components (e.g., database server computers, application server computers, etc.) that act as a single pool of seamless resources when accessed within computing environment 400. In some embodiments, host 405 includes database manager 410, and application 412. In some embodiments, computing environment 400 can include one or more additional host devices with the same/similar functionality of host 405. In some embodiments, host 405 can generate queries to be processed by database 430 and/or display the results of each query.

Database manager 410 Database manager 410 can be any combination of hardware and/or software configured to manage database operations. The operations may include storing, retrieving, querying, manipulating, monitoring, and analyzing data along with other similar operations. In some embodiments, database manager 410 includes a database management system (DBMS). In some embodiments, database manager 410 is part of a federated database system (which can include database 430). A federated database system can transparently map multiple autonomous database systems into a single federated (combined) database. In some embodiments, a federated database system acts as a virtual database, where there is no actual data integration in the constituent databases. In some embodiments, database manager 410 can manage the data exchange with database 430. This can include sending the query, receiving the data, and formatting the data such that host 405 can display the data as needed.

Application 412 can be any combination of hardware and/or software that is configured to generate a query. A query can be a request for data and/or information stored in one or more tables of one or more databases. The databases may be local (e.g., on host 405), or remote (e.g., database 430). In some embodiments, application 412 sends the query to database manager 410. In some embodiments, application 412 is included in database manager 410. In some embodiments, application 412 can generate/send two or more different queries. In some embodiments, the two or more queries can target a common set of columns within one or more tables. In some embodiments, the query can be configured to target one or more columns in one or more tables, or one or more partitions within a database.

Database 430 can be any combination of hardware and/or software configured to store data in a database system. In some embodiments, database 430 is part of a federated database system. In some embodiments, database 430 includes two or more databases communicatively connected that can act as a single database. In some embodiments, database 430 may be contained within host 405. In some embodiments, database 430 can include query manager 431, SQL parser 432, optimizer 433, statistics 434, execution structures 435, and data 436.

Query manager 431 can be any combination of hardware and/or software configured to oversee execution of an SQL query. In some embodiments, query manager 431 includes one or more of SQL parser 432, optimizer 433, statistics 434, execution structures 435, and data 436. However, FIG. 4 depicts them as separate components for discussion purposes.

In some embodiments, query manager 431 can alter/update/transform queries. In some embodiments, the transformation is configured to generate and/or incorporate a merged column. The type of transformation can be based on the type of the command in the query. In some embodiments, the transformation is based on identifying a lowest cost access plan. The cost can be determined by optimizer 433. In some embodiments, the transformation includes updating a table definition and/or a target column definition in a received query. The updating of the table definitions can include merging two or more columns into a single column and then the actions of the query can be directed to the new column instead of the original columns (that are included in the merged column). In some embodiments, updating the target column definition include merging two or more of the target columns.

The SQL parser 432 can be any combination of hardware and/or software configured to determine actions to be performed from a query. In some embodiments, SQL parser 432 determines individual commands to fully execute the query (e.g., return a set of data). In some embodiments, SQL parser 432 generates one or more parse trees for each query. A parse tree is a data structure that visually represents how the target data from the query interrelate. In some embodiments, SQL parser 432 develops one or more access plans (or execution structure). The access plan may include a stack (set) of commands, where each command is considered a node.

In some embodiments, at least one of the access plans generated includes a merged column, and at least one of the access plans uses the original table structure, where the original table structure does not include a merged column. In some embodiments, the one or more access plans can include all or some of the potential merging combinations. For example, assume a table has four columns, A, B, C, and D and each of B, C, and D can be merged. For the embodiment where all the combinations are possible, there will be an access plan that merges B and C, another that merger, B and D, a third that merges C and D, and a fourth that merges B, C, and D. The embodiments with some can have any subset of the potential combinations. In some embodiments, the generated access plans can be sent to and stored in execution structure 435.

Optimizer 433 can be any combination of hardware and/or software configured to optimize query execution in database 430. In some embodiments, optimizer 433 is included in SQL parser 432. In some embodiments, optimizer 433 can select one of the one or more access plans to execute. In some embodiments, optimizer 433 can estimate the computational and/or time cost of each generated access plans. In some embodiments, optimizer 433 can compare each cost against all other costs. The access plans can be ranked from a lowest cost to a highest cost. In some embodiments, the cost of the merged column access plans are compared against at least unaltered (no merged columns) access plan. If there are more than one unaltered access plans, the lowest cost unaltered access plan can be used as the comparator. The estimated cost can include the cost of merging the two or more columns as indicated by the access plan. In some embodiments, the cost estimate is based on one or more of statistics 434, the target of the query, the amount of data requested, past execution of the query and similar queries, and other similar factors.

Statistics 434 can be any combination of hardware and/or software configured to store database statistics. In some embodiments, statistics 434 can include database statistics. In some embodiments, statistics 434 tracks distribution of values in the tables and indexes in the database (e.g., data 436). In some embodiments, statistics 434 is updated and maintained by database manager 410. In some embodiments, statistics 434 includes frequency data. Frequency data represents the relative occurrence of a given value. In some embodiments, statistics 434 includes histograms. Histograms may represent relative occurrences of a range of values.

Figure 5:
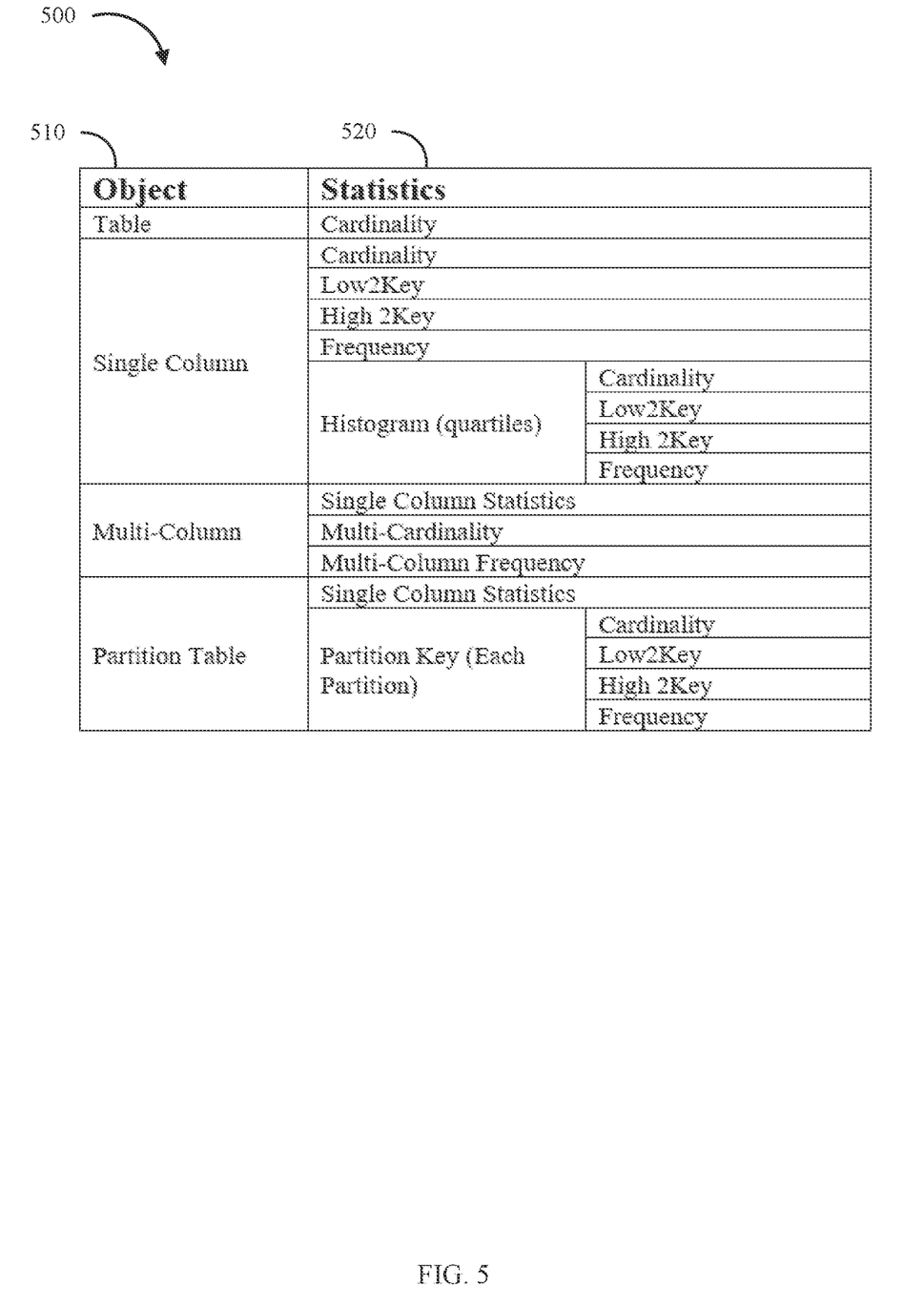
FIG. 5 illustrates database statistics that can be stored and analyzed, in accordance with some embodiments of the present disclosure.

FIG. 5 is one embodiments of the types of data that can be stored in statistics 434. FIG. 4 includes Column 510 for the Object, and column 520 for the Statistics kept. The objects can include tables, single columns, multiple columns, and a partition. For a table, the statistics can include cardinality. Cardinality is a representation of the uniqueness of data. The lower the cardinality, the more duplicated values. The higher the cardinality, the more unique values. For a single column, the statistics can include cardinality, low key, high key, and frequency. The low key and high key can indicate the range of the column. The frequency can represent the number of times a specific value occurs (e.g., number of nulls). The single column can also include histograms. A histogram can be a graphical representation of the data in a column. The histogram can have the cardinality, high key, low key, and frequency for each quartile of the column. For multi-column (group of columns), the statistics can include single column statistics, cardinality, and multi column frequency. A partition can be logical separation of a database. For partitions, the statistics can include partition keys to mark the distinctions between the partitions within each partition, cardinality, low key, high key, and frequency.

Execution structures 435 can be a set of access plans. The set of access plans can be previously executed. In some embodiments, execution structures 435 can include cost data for the execution structures. The access plans stored in execution structures can include the estimated cost and actual cost for previously executed plans. Execution structures 435 can be used to estimate the costs of access plans being estimated.

Data 436 can be any data structure configured to store and organize data. In some embodiments, data 436 can include one or more data structures. The data structures can include tables, indices, indexes, columns, and the like. The data structures can be the target of the queries. Data 436 can include one or more separate tables and/or one or more indexes. Each table/index can include one or more columns. In some embodiments, data 436 is a target of queries.

In some embodiments, one or more columns within data 436 can be sparse columns. The sparse columns can be in one table or in two or more different tables. A sparse column can be any column that has a blank/null value. In some embodiments, a sparse column is any column that has a null value above a predetermined threshold. The threshold can be a percentage or proportion (e.g., ⅓ of entries) or the like. In some embodiments, a sparse column can be a column with frequently changing data. Frequently changing data can be data that changes above a predetermined rate. The rate can be based on a time (e.g., once a day, once per hour, etc.). The rate can be based on changes relative to other columns. For example, the top 30% of columns based on rate of change can be sparse columns.

In some embodiments, data 436 includes one or more combined columns (or merged columns). The combined column can be when the data from any two columns are merged into a single column. In some embodiments, the merged column includes two or more sparse columns. In some embodiments, sparse columns can be predesignated as sparse columns.

Figure 6:
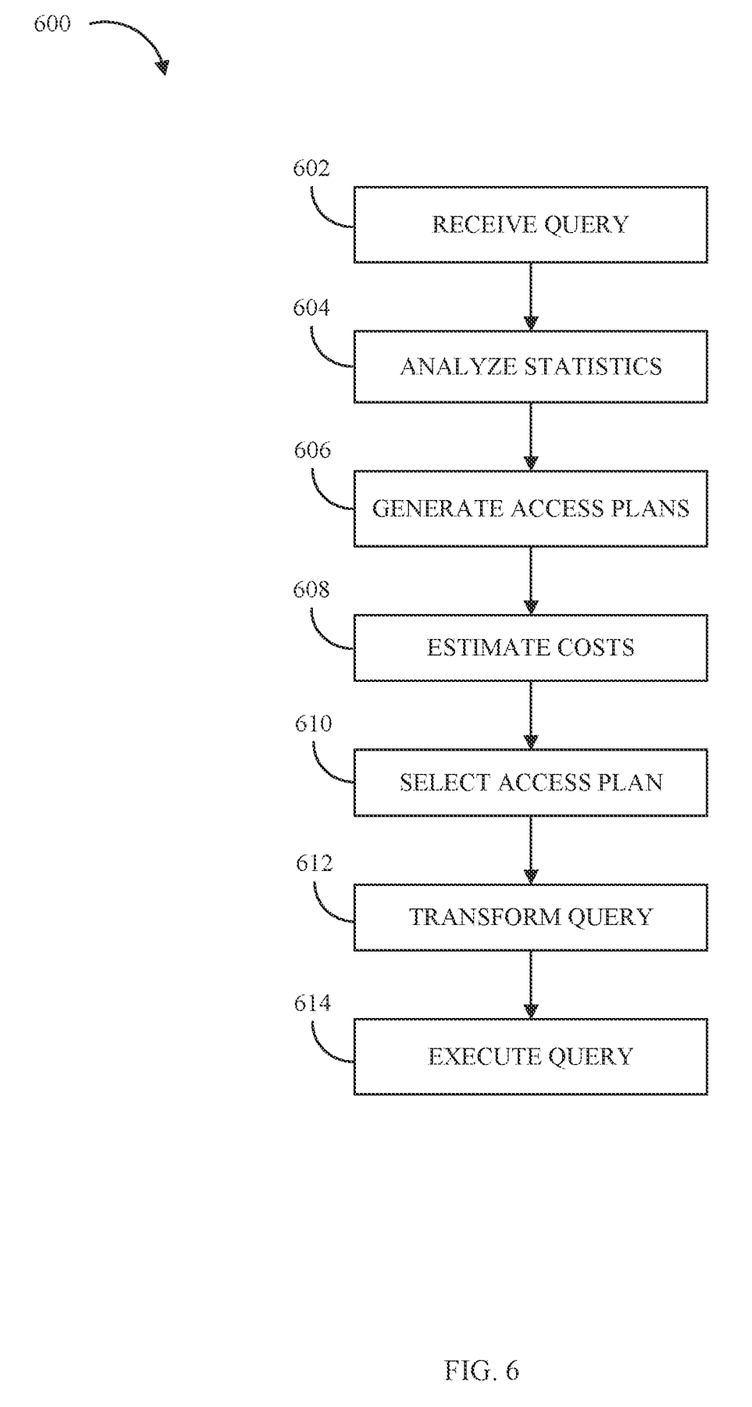
FIG. 6 illustrates a flow chart of an example method to transform queries to use merged columns, in accordance with some embodiments of the present disclosure.

FIG. 6 depicts a flowchart of an example method, method 600, for executing queries using merged columns that can be performed in a computing environment (e.g., computing environment 400 and/or cloud computing environment 50). One or more of the advantages and improvements described above for executing queries using merged columns may be realized by method 600, consistent with various embodiments of the present disclosure.

Method 600 can be implemented by one or more processors, host 405, database manager 410, application 412, database 430, query manager 431, SQL parser 432, optimizer 433, statistics 434, execution structures 435, data 436, and/or a different combination of hardware and/or software. In various embodiments, the various operations of method 600 are performed by one or more of host 405, database manager 410, application 412, database 430, query manager 431, SQL parser 432, optimizer 433, statistics 434, execution structures 435, and data 436. For illustrative purposes, the method 600 will be described as being performed by query manager 431.

At operation 602, query manager 431 receives a query. In some embodiments, the query is received from application 420. In some embodiments, the query is received in SQL. In some embodiments, the query is configured to perform one or more commands on a set of data, wherein the data is stored in database 430. The commands can be directed at one or more columns. The commands can include one or more of a select command, an insert command, an update command, and a delete command. In some embodiments, operation 602 includes parsing the query. The query may be parsed by SQL parser 432. The parsing can identify one or more target columns of one or more target tables.

At operation 604, query manager 431 analyses statistics related to the query. In some embodiments, the analysis is based on the target columns and/or the commands included in the query. In some embodiments, the analysis includes determining which of the target columns are sparse columns. In some embodiments, the sparse columns are predetermined as sparse columns. The predetermination can include marking each sparse columns (e.g., with a flag, name, etc.) The marking can be input by a user and/or updating. In some embodiments, the determination of sparse columns is based on a number of holes in the column. The analysis can determine a hole rate for each column. The hole rate can be based on statistics 434. For example, the frequency of null value compared to the number of entries in the column can indicate a hole rate. In some embodiments, the hole rate is based on the number of rows targeted by the query. The number of rows can be based on the predicate of the query command (e.g., where Col A>X). The histogram and/or other statistics can be used to determine/estimate the number of rows where A>X (target rows) and/or the number of holes. In some embodiments, a column can be a sparse column if the hole rate is above a threshold (e.g., 30%, 50%, etc.). The threshold can be for the targeted rows (targeted threshold) or an overall threshold (all rows in column). The threshold can be adjusted. In some embodiments, the sparse columns are a top number of columns with the highest hole rate (e.g., columns with four highest hole rates, etc.).

At operation 606, query manager 431 generates one or more access plans for the query. The access plans can be generated by SQL parser 432. In some embodiments, at least one access plan includes merging two or more columns, where at least one of the columns included in the merging is a sparse column. In some embodiments, all of the columns included in the merging are identified as sparse columns. In some embodiments, the one or more access plans include an access plan for the original query with no merged columns and at least one access plan with a merged columns. In some embodiments, the various access plans can include all possible variations of merging columns or a subset of all possible variations.

At operation 608, query manager 431 estimates the cost of each of the access plans. In some embodiments, the estimations are performed by optimizer 433. The cost estimation can be a computational cost to fully execute the query, and/or a time cost. In some embodiments, the estimation for access plans with merged columns, can include the cost of generating a merged column (or merging the columns) and executing the query. In some embodiments, the cost estimation can be based on statistics 434. In some embodiments, the estimation is based on previously executed/evaluated queries. the previously executed queries can be stored in execution structures 435.

At operation 610, query manager 431 selects an access plan. In some embodiments, the selection is based on the cost estimations. The access plan with the lowest estimated cost can be selected. In some embodiments, the selected access plan can be the lowest cost access plan that includes a merged column.

At operation 612, query manager 431 transforms the query. In some embodiments, the transformation is based on the selected access plan. In some embodiments, the transformation includes generating the merged column and adjusting the commands to access the merged column. In some embodiments, the generating of the merged column is incorporated into the transformed query, so the new query logic includes a merge command.

In some embodiments, generating the merged column includes updating the table definition. The update can include an alter table command. The alter table command can add the merged column. The merged column can be defined as accepting any data type (e.g., char, varchar, etc.). The data type can be based on the data type of the columns that were merged. In some embodiments, the transforming of the query includes updating the query to include the merged column from the updated table definition.

In some embodiments, the transforming of the query includes updating the query to include the merged column. The including can be changing the query to merge the columns and/or referring to a previously merged column. The update can be based on the type of command. In some embodiments, the command includes a select command. When a select command refers to a merged column in the predicate (e.g., condition such as where, having, etc.), the query is updated to include a "mergeexists" function. The mergeexists function can merge two or more columns. In some embodiments, the mergeexists function can be used to generate a merged column. In some embodiments, the sparse column is referenced to by expression of the command (e.g., select, group by, etc.) In some embodiments, the command includes a delete command. The delete command can be transformed consistent with the select command.

In some embodiments, the command includes an update and/or a delete command. In some embodiments, the transformation rules for the update and/or delete command can be consistent with the select command. In some embodiments, for a set clause in the update, the transformation can include a "mergedmodify" function.

Figure 7A:
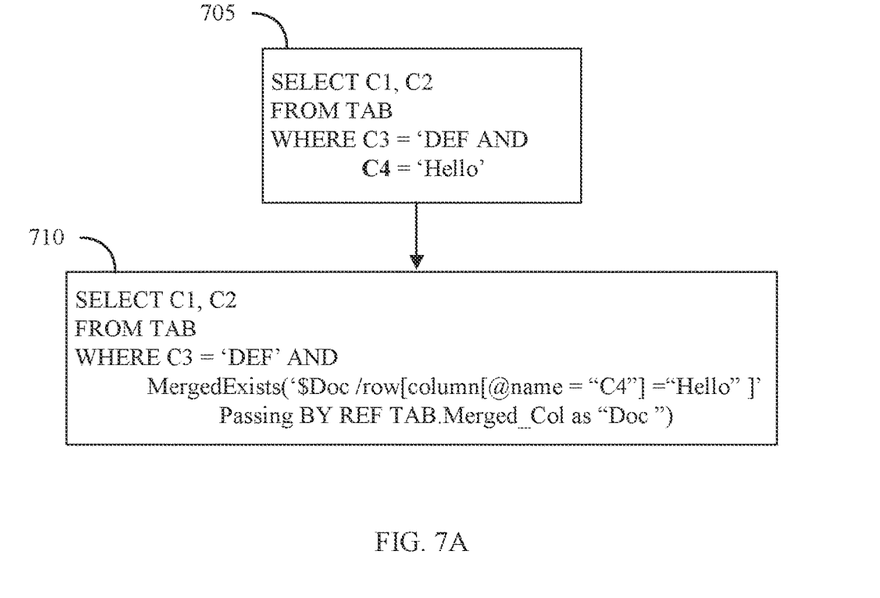
FIGS. 7A-7E illustrate query transformation for query commands.

FIGS. 7A-7E include embodiments of various query transformations using merged columns. FIG. 7A displays one embodiment of a select command and includes select command 705 and transformed select command 710. Select command 705 includes the sparse columns, C3 and C4, in the predicate of the command. The command can be transformed to transformed select command 710 that will cause C3 and C4 to merge using a "mergeexists" command.

Figure 7B:
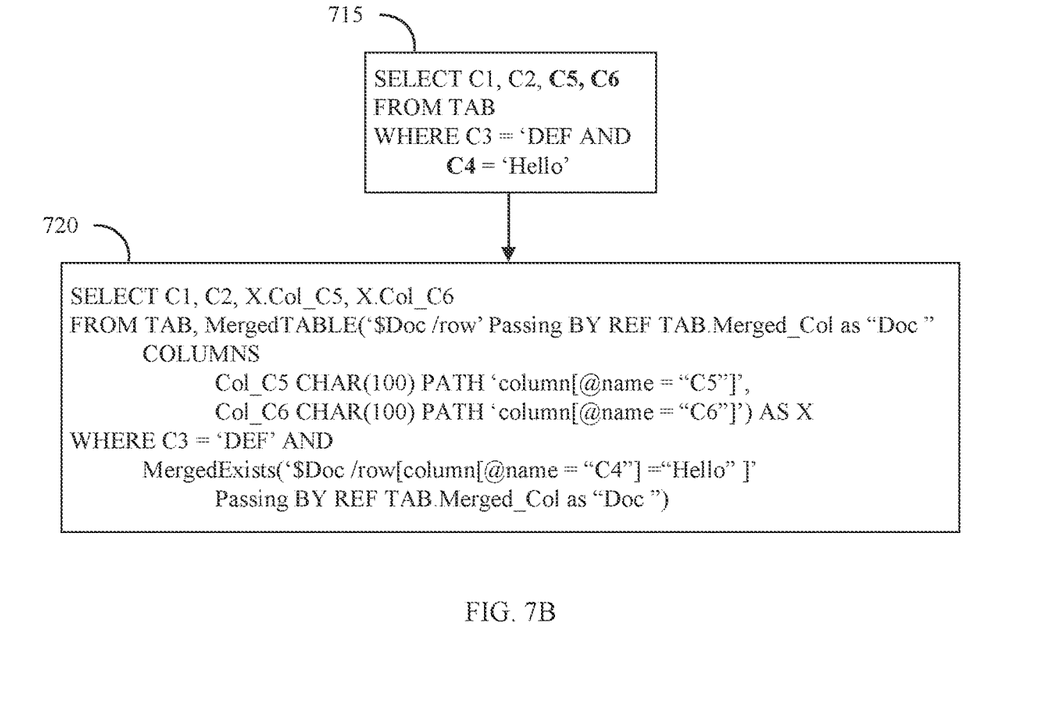

FIG. 7B is one embodiment of a select command and includes second select command 715 and second transformed select command 720. Second select command 715 includes the sparse columns, col 5 and col 6, in the expression, and sparse column C3 in the predicate. Transformed second command 720 merges C5 and C6 using a "mergedtable" command and the same function on C3 and C4 as in FIG. 7A.

Figure 7C:
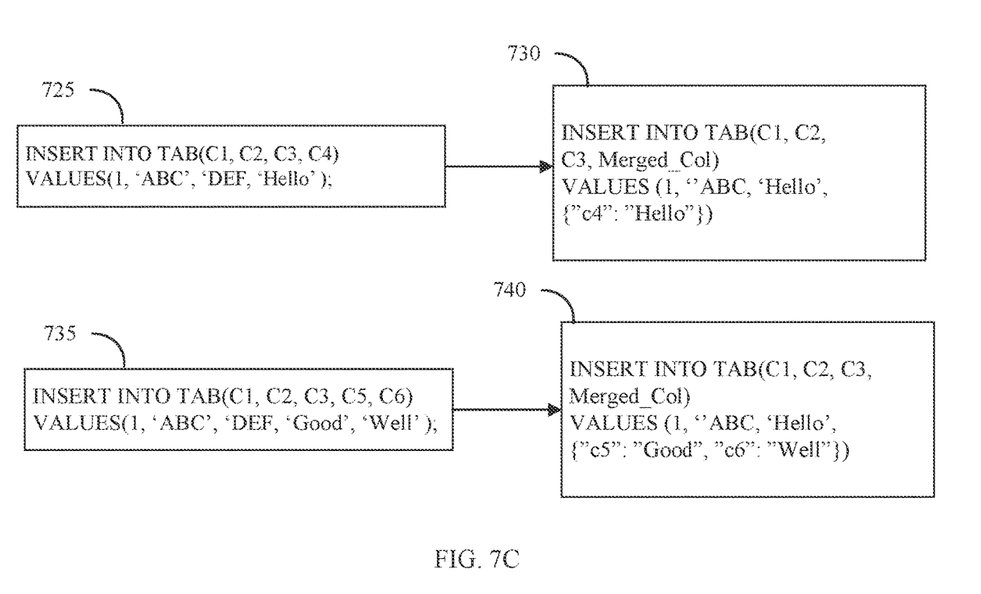

FIG. 7C is one embodiment of two insert commands and includes first insert command 725, second insert command 735, first transformed insert command 730, and second transformed insert command 740. Insert command 725 is configured to insert data in to C1, C2, C3, and C4, and second insert command 735 into C1, C2, C3, C5, and C6, where C4, C5, and C6 are sparse columns. In this case, they can be considered sparse because they will each have at least one hole from these two commands. The first transformed insert command 730 and second transformed insert command 740 both insert data into the merged column (merged col). The same amount of data is entered into the database, but it is done in fewer columns, and fewer null values are entered, thereby saving computing costs.

Figure 7D:
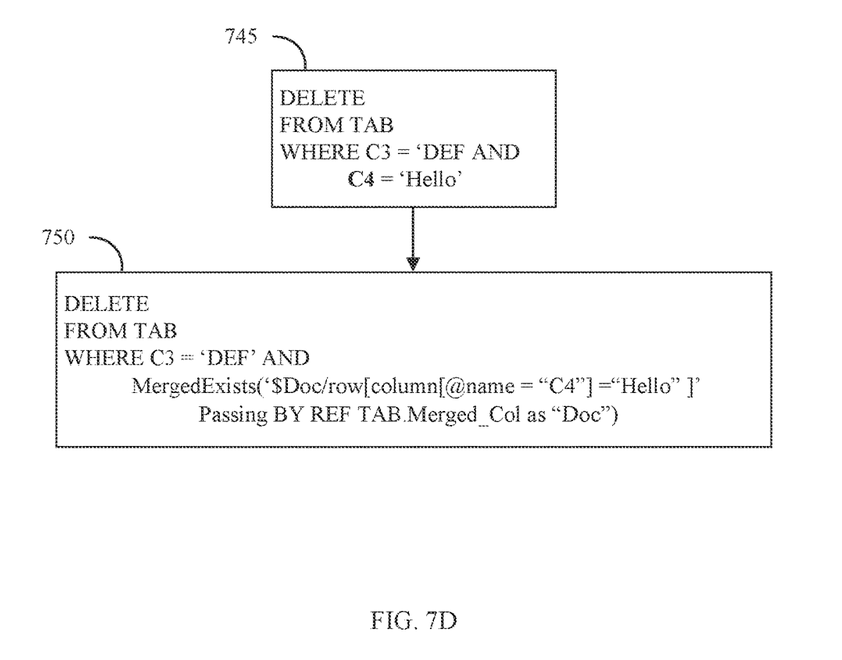

FIG. 7D is one embodiment of a delete command and includes delete command 745 and transformed delete command 750. Delete command 745 is directed at sparse column C3 and C4. Transformed delete command 750 referenced the merged column that includes both C3 and C4 vice each column individually.

Figure 7E:
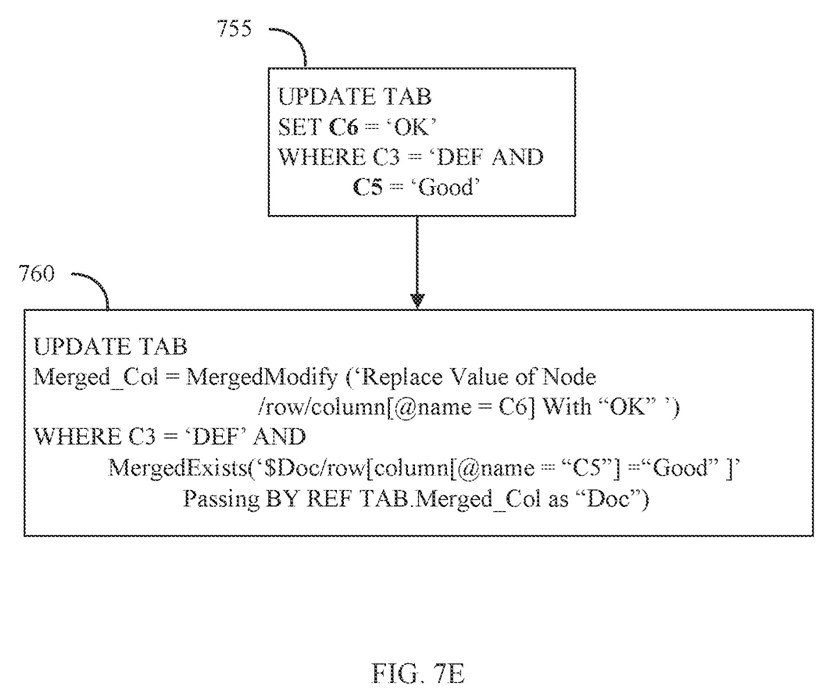

FIG. 7E is one embodiment of an update command and includes update command 755 and transformed update command 760. Update command 755 target C3, C5, and C6. Transformed update command 760 uses a "mergedmodify" function and a merged exists function to insert the data into the merged column.

At operation 614, query manager 431 executes the query. The query can be executed based on the transformed query to include the merged column. In some embodiments, the execution includes returning the results of the query to the requestor (e.g., host 405, application 412, etc.). In some embodiments, operation 614 includes storing the executed structure, with the actual computational costs and time costs, in executed structure 435. The stored data can be used to better predict the cost of future access plans with merged columns.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, from a host, a first query configured to perform a command on one or more target columns in a database;
   analyzing a set of statistics for the database;
   determining, based on the analyzing, that a first column of the one or more target columns is included in a set of sparse columns;
   generating a plurality of access plans for the first query, including a first access plan that merges the first column with a second column;
   selecting the first access plan;
   merging, in response to the selecting, the first column with the second column into a merged column;
   transforming, based on the first access plan, the first query to access the merged column; and
   executing, in response to the transforming and the merging, the first query.

2. The computer-implemented method of claim 1, wherein the generating the plurality of access plans comprises estimating a cost to execute each access plan including a first estimation for the first access path, and
   the selecting the first access plan is based on the first estimation being a lowest cost.

3. The computer-implemented method of claim 2, wherein the plurality of access plans includes a second access plan that merges the first column with a third column, and a third access plan with no merged column.

4. The computer-implemented method of claim 3, wherein the estimated cost of the first estimation is lower than an estimated cost of the third access plan based on the merging of the first column and the second column.

5. The computer-implemented method of claim 3, further comprising: determining, based on the analyzing, the second column and the third columns are included in the set of sparse columns.

6. The computer-implemented method of claim 1, wherein the analyzing the set of statistics includes calculating a hole rate for each of the one or more target columns.

7. The computer-implemented method of claim 6, wherein the determining the first column is included in the set of sparse columns is based on the hole rate for the first column being above a threshold.

8. The computer-implemented method of claim 7, wherein the determining the first column is included in the set of sparse columns is based on the hole rate for the first column being pre-designated as a sparse column.

9. The computer-implemented method of claim 1, wherein:
the command includes a select command, and the first column is in a predicate of the first query; and
the transforming of the first query results in a transformed select command that includes a mergedexist function for the first column and the second column.

10. The computer-implemented method of claim 1, wherein:
the command includes an insert command configured to insert a data into the first column; and
the transforming of the first query results in a transformed insert command configured to insert the data into the merged column.

11. The computer-implemented method of claim 1, wherein:
the command includes a delete command configured to delete a data from the first column; and
the transforming of the first query results in a transformed delete command configured to delete the data from the merged column.

12. The computer-implemented method of claim 1, wherein:
the command includes an update command configured to delete a data from the first column; and
the transforming of the first query results in a transformed update command configured to update the data in the merged column.

13. A computer program product, the computer program product comprising a computer readable storage medium having program instructions embodied therewith, the program instructions executable by a processing unit to cause the processing unit to:
receive, from a host, a first query configured to perform a command on one or more target columns in a database;
analyze a set of statistics for the database;
determine, based on the analysis, a first column of the one or more target columns is included in a set of sparse columns;
generate a plurality of access plans for the first query, including a first access plan that merges the first column with a second column;
select the first access plan;
merge, in response to the selecting, the first column with the second column into a merged column;
transform, based on the first access plan, the first query to access the merged column; and
execute, in response to the transforming and the merging, the first query.

14. The computer program product of claim 13, wherein the generation the plurality of access plans includes estimating a cost to execute each access plan, and
the selection of the first access plan is based on the estimating the cost of the first access plan being a lowest cost, the first access plan.

15. The computer program product of claim 14, wherein the plurality of access plans includes a second access plan that merges the first column with a third column, and a third access plan that does not merge any columns.

16. The computer program product of claim 13, wherein the analyzing the set of statistics includes calculating a hole rate for each of the one or more target columns.

17. The computer program product of 16, wherein the determining the first column is included in the set of sparse columns is based on the hole rate for the first column being above a threshold.

18. A system comprising:
a processor;
a database; and
a computer-readable storage medium communicatively coupled to the processor and storing program instructions which, when executed by the processor, are configured to cause the processor to:
analyze a set of database statistics to determine a hole rate and a data distribution for each column of a plurality of columns stored in the database;
identify, from one or more target columns of a first query and based on the hole rate for each column, a set of sparse columns from the one or more target columns;
estimate a computation cost for each access plan of a set of access plans, where a first access plan includes merging two or more columns into a merged column, wherein the merged column comprises a first sparse column and a second sparse column from the set of sparse columns;
select, based on the first access plan having a lowest estimated computation cost, the first access plan;
merge, in response to the selection, the first sparse column and the second sparse column into the merged column; and
transform the first query to execute using the merged column.

19. The system of claim 18, wherein, the hole rate of each sparse column is above a predetermined threshold.

20. The system of claim 19, wherein the set of access plans includes one access plan for each possible combination of merging each sparse column with one or more additional columns from the set of sparse columns.

* * * * *